United States Patent

[11] 3,617,911

[72] Inventor John A. Copeland, III
Gillette, N.J.
[21] Appl. No. 812,115
[22] Filed Apr. 1, 1969
[45] Patented Nov. 2, 1971
[73] Assignee Bell Telephone Laboratories, Incorporated
Murray Hill, N.J.

[54] WIDE BAND DIRECT-CURRENT-PUMPED SEMICONDUCTOR MASER
18 Claims, 7 Drawing Figs.

[52] U.S. Cl. .......... 330/4, 331/94
[51] Int. Cl. .......... H01s 1/00
[50] Field of Search .......... 330/4; 307/88

[56] References Cited

UNITED STATES PATENTS 3,365,583 1/1968 Gunn .......... 307/205
3,368,161 2/1968 Hensel .......... 330/4

OTHER REFERENCES

Zylbersztejn, IBM Tech. Discl. Bull., Vol. 9, No. 5, p. 499, Oct. 1966

*Primary Examiner*—Rodney D. Bennett, Jr.
*Assistant Examiner*—Joseph G. Baxter
*Attorneys*—R. J. Guenther and Arthur J. Torsiglieri

ABSTRACT: A wafer of two-valley semiconductor material such as gallium arsenide is used as the active negative temperature medium of a maser. The maser is pumped by a DC voltage across the wafer. Care is taken to avoid the formation of Gunn-effect domains as, for example, by using a wafer with an appropriately small *n*L product. In a preferred embodiment, a magnetic field across the wafer increases bandwidth, efficiency, and frequency of operation. A layer of a material, such as GaP, having a lower energy valley corresponding to the upper valley of the active medium, may be included between the cathode contact and the active medium for further improving efficiency.

INVENTOR
J. A. COPELAND, III
BY
Roderick B Anderson
ATTORNEY

WIDE BAND DIRECT-CURRENT-PUMPED SEMICONDUCTOR MASER

BACKGROUND OF THE INVENTION

This invention relates to masers, and more particularly, to masers having a semiconductor active medium. Maser is an acronym for microwave amplification by stimulated emission of radiation. As used herein, the term "microwave" is intended to include whatever radiation frequencies may be emitted in accordance with the principles of the invention.

As described, for example, in the book *Microwave Solid State Masers*, by A. E. Siegman, McGraw-Hill Book Company, 1964, a maser is a device having an active medium in which a sufficient number of particles can be excited by a mechanism called pumping to a predetermined high unstable energy level to create a population inversion. When a higher number of particles exists at a high unstable energy level than at the normal, unexcited level, a population inversion is said to exist and the active medium is known as a negative temperature medium. The energy difference between the two energy levels corresponds to a specific characteristic frequency, and if the active medium is located in a cavity resonant at that frequency, or if energy of that particular frequency is directed through the medium, emission of radiation at the characteristic frequency will be stimulated.

Relating maser transitions to semiconductor terminology, it can be shown that most transitions take place between the conduction band and the valence band or between the conduction band and specific energy levels within the forbidden band. It can further be shown that, because transitions are between discrete and well-defined energy levels, only frequencies within a relatively narrow bandwidth can be radiated. Another limitation of masers is that high-frequency pumping energy normally must be applied to the wafer to establish the required population inversion.

Since, as will be described below, my invention involves the use of two-valley semiconductor materials, some discussion of prior devices using materials of this type is appropriate. The two-valley semiconductor is one characterized by a stable lower energy band valley in which carriers have a relatively high mobility, separated by a relatively small energy gap from a higher unstable energy band valley in which carriers have a relatively low mobility. The most widely used two-valley material is N-type gallium arsenide; the majority carriers are of course electrons, and the energy band valleys are in the conduction band. With an appropriate electric field extending through a wafer of gallium arsenide, electrons will be excited from the lower energy band valley to the upper valley where they have a lower mobility. A threshold field is reached at which a further electric field increase results in a decrease of electron velocity due to the lower mobility of upper valley electrons. This inverse relationship between electron velocity and electric field gives rise to a differential negative resistance within the wafer that can be used for generating oscillations and, under appropriate conditions, for amplification.

If the product of doping and length ($nL$) of the wafer is sufficiently high, an electric field in excess of the threshold value will produce in the wafer traveling domains or shock waves due to a periodic accumulation of charge within the device. The patent of Gunn, U.S. Pat. No 3,365,583, describes a family of devices taking advantage of this phenomenon. The domain formation phenomenon is in many ways a drawback to the operation of devices of this type in that it makes operation as an amplifier difficult and it inherently limits the frequency and power at which the device can be operated. Various methods that have been proposed for domain suppression include using a wafer having a low-$nL$ product, using a physically thin wafer, and limiting charge accumulation by the use of an external resonant circuit. The latter mode of operation is known as LSA operation, for Limited Space-charge Accumulation, and is described, for example, in the paper "LSA Diode Operation Theory," by J. A. Copeland III, *Journal of Applied Physics*, Vol. 38, No. 8, July 1967, pages 3096–3101.

It can be shown that all devices that operate on the principle of differential negative resistance resulting from a low-mobility upper valley are limited in frequency whether or not traveling domains are formed. For gallium arsenide the maximum frequency of operation, either as an amplifier or as an oscillator, is about 200 gigahertz; this limit is described, for example, in the paper "Hot Electron Relaxation Times in Two-Valley Semiconductors and Their Effect on Bulk-Microwave Oscillators," by P. Bas and R. Bharat, *Applied Physics Letters*, Vol. 11, Dec. 15, 1967, pages 386–388.

SUMMARY OF THE INVENTION

As suggested above, I have found that the bandwidth of semiconductor masers can be substantially increased by using as the active material a wafer of two-valley material such as gallium arsenide. Because the maser works on the principle of stimulated emission of radiation, it does not have the frequency limitations characteristic of two-valley negative resistance devices known variously as Gunn-effect devices or bulk-effect diodes. Moreover, my maser does not require the application of high-frequency energy to establish population inversion; rather, the required pumping is provided by a DC voltage across the wafer.

In accordance with an illustrative embodiment of the invention, a wafer of two-valley material extends across a waveguide for transmitting microwave energy to be amplified. Contacts on opposite sides of the wafer bias the wafer at a sufficient voltage to transfer a majority of the free carriers to the upper energy band valley. Transfer in both directions inherently takes place simultaneously; that is, carriers are transferred from the upper valley to the lower valley as well as from the lower valley to the upper valley. However, because of the lower mobility in the upper valley, carriers tend to become concentrated at the lowermost portion of the upper valley. Hence, carriers scattered from the upper valley to the lower valley predominantly have an energy level corresponding to the energy minimum of the upper valley. This in turn establishes a population inversion in the lower valley.

In order to stimulate the emission of radiation, the wave energy to be amplified should have a frequency corresponding to the energy difference of available inverted carriers and stable carriers in the lower energy band. It can be shown, however, that the frequency to be amplified must exceed the average scattering frequency $\nu a/2\pi$ of carriers in the lower energy band. Since the energy difference of inverted carriers cannot exceed the energy difference $E_{v2}-E_{v1}$ of the two energy band minima, the frequency $f$ of the stimulating wave may be expressed as $$\frac{\nu}{2\pi}<f<\frac{E_{v2}-E_{v1}}{h}$$

where $h$ is Planck's constant. In the case of an amplifier, the wave to be amplified should have a frequency $f$ within the range described. If an oscillator, the maser wafer should be contained in a resonator having a frequency that complies with this condition.

It can further be shown that the frequency of operation is dependent upon any magnetic field extending through the wafer. As will become clear later, it is normally preferred that a magnetic field be applied to the wafer, to increase both the frequency of operation and the bandwidth.

In accordance with another feature of the invention, electric fields that stimulate emission of radiation extend in a direction transverse to the direction of the wafer bias electric field. Also, the magnetic fields associated with the stimulating wave should be in a direction parallel to the bias field.

In accordance with an alternative embodiment of the invention, the active wafer is of N-type semiconductor material, and an intermediate semiconductor layer is located between the negative or cathode contact of the device and the active wafer. When the wafer is biased, the intermediate layer has a lower stable energy band valley of approximately the same energy level as the upper valley of the active wafer. Hence, electrons are injected from the lower valley of the intermediate layer to the upper valley of the active wafer. This enchances the mechanism resulting in population inversion as described before and increases device efficiency.

These and other objects, features and advantages of the invention will be better understood from a consideration of the following detailed description taken in conjunction with the drawing.

DRAWING DESCRIPTION

DETAILED DESCRIPTION

Figure 1:
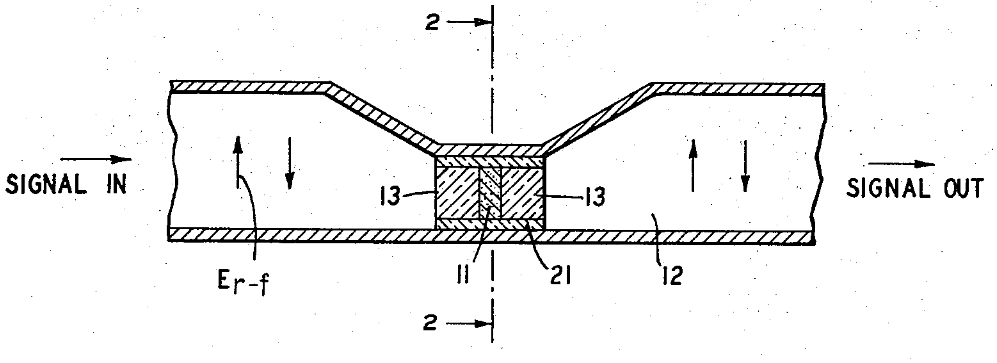
FIG. 1 is a sectional schematic view of a maser amplifier in accordance with an illustrative embodiment of the invention.
Figure 2:
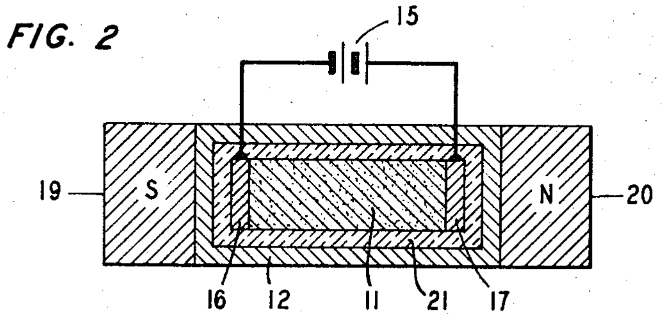
FIG. 2 is a view taken along lines 2—2 of FIG. 1.

Referring now to FIGS. 1 and 2, there is shown illustratively a microwave amplifier comprising a semiconductor wafer 11 contained within a waveguide 12. Signal waves to be amplified, having electric field vectors $E_{rf}$, are propagated by the waveguide 12 through the wafer 11. The wafer 11 is of two-valley semiconductor material such as N-type gallium arsenide having a typical carrier concentration of $10^{15}$ carriers per cubic centimeter and is contained between dielectric matching sections 13, the purpose of which is to minimize, in a known manner, signal wave reflection and attenuation.

Referring to FIG. 2, the wafer is biased by a voltage source 15 connected to opposite wafer contacts 16 and 17. A direct current magnetic field is produced through the wafer by magnets 19 and 20 which are shown for illustrative purposes as being permanent magnet pole pieces. The semiconductor wafer is insulated from the waveguide by an insulating layer 21.

Figure 3:
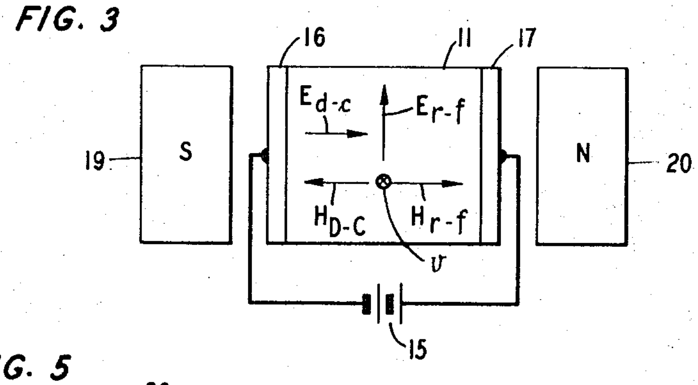
FIG. 3 is a schematic illustration corresponding to FIG. 2 which shows the relative directions of electric and magnetic vectors within the semiconductor wafer of FIG. 2.

FIG. 3 shows the relative directions of the electric and magnetic field vectors within the wafer 11. The biasing voltage applied between opposite contacts 16 and 17 of course produces a direct current electric field in the wafer shown by vector $E_{dc}$. The waveguide in which the wafer is contained is constructed such that the electric fields $E_{rf}$ associated with the signal wave are transverse to $E_{dc}$. The direct current magnetic field $H_{DC}$ extending between magnetic pole pieces 19 and 20 is arranged to be transverse to the electric field $E_{rf}$. The waveguide is also designed such that the alternating magnetic fields $H_{rf}$ associated with the signal wave are parallel to the direct-current field $H_{dc}$. The arrow "tail" labeled "v" is intended to indicate that the direction of signal wave velocity is "into the paper."

Figure 4:
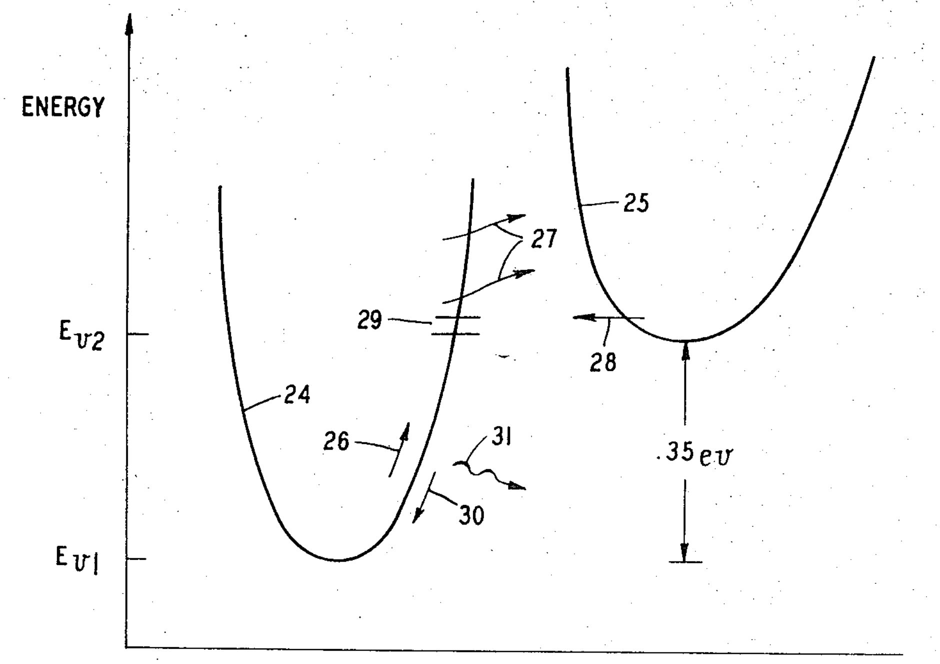
FIG. 4 is an illustration of two energy band valleys within the semiconductor wafer of FIGS. 1 and 2.

FIG. 4 illustrates the population inversion mechanism which permits the signal wave to stimulate the emission of radiation at an appropriate frequency for giving amplification. The active maser medium includes two energy bands or valleys 24 and 25 separated by a relatively small energy band gap, which, in the case of N-type gallium arsenide, is 3.5 electron volts, as shown. In the absence of any external forces, the majority carriers (in this case, electrons) are concentrated at or near the bottom of the lower energy band 24, that is, near energy level $E_{r1}$, the energy band minimum of the lower valley. Electrons in the lower valley 24 are characterized by a higher mobility than those in the upper valley 25. With the application of the direct current bias field, electrons at $E_{vl}$ are raised to higher energy levels as designated by the arrow 26. Many of these electrons are in turn transferred to the upper valley 25 by a phenomenon known as intervalley scatter, illustrated by arrows 27. Because electrons in the upper valley 25 have a lower mobility than those in the lower valley, they tend to have a lower energy distribution and hence are relatively densely concentrated at the bottom of the upper valley 25; that is, near energy level $E_{r2}$.

Intervalley scatter also results in the transfer of electrons from the upper valley to the lower valley as shown by arrow 28. Since, however, most of the upper band electrons are at or near the upper band minimum, most of the electrons transferred to the lower band from the upper band will be concentrated within an energy distribution 29 near energy level $E_{r2}$. It can be shown that approximately 80 percent of the electrons transferred by intervalley scatter from the upper valley to the lower valley of gallium arsenide lie within energy band 29 defined by energy levels $E_{r2}$ and $(E_{r2}+3/2k\ I)$, where $k$ is Boltzmanns constant and $T$ is temperature. When a larger number of electrons within energy band 24 exists at a high unstable energy level than at stable levels, at or near $E_{v1}$, the population inversion has been established, the wafer is a negative temperature medium, and maser operation is possible.

Of course, when the signal wave passes through the active medium, it will be amplified if a population inversion exists between energy levels corresponding to the signal frequency. When this is true, the signal wave forces a relaxation to a lower energy level shown by arrow 30 accompanied by the emission of radiation at the signal frequency, indicated by arrow 31.

The highest frequency that can be radiated through the mechanism described is, for all practical purposes, limited by the energy difference $(E_{r2}-E_{r1})$ between energy band 29 and the bottom or minimum of lower valley 24. It can further be shown that radiation cannot be stimulated at frequencies lower than the average scattering frequency $\nu_a$ of all majority carriers in the lower energy band. Expressing all frequencies in terms of cycles per unit time, the frequency $f$ of operation of my maser is given by $$\frac{\nu_a}{2\pi} < f < \frac{E_{v2}-E_{v1}}{h} \quad (1)$$

where $h$ is Planck's constant. For N-type gallium arsenide, $\nu_a$ is approximately $10^{12}$, which means that the frequency to be amplified must be greater than about 170 gigaHertz.

It can also be shown that those frequencies that may be amplified are centered about a frequency $f_c$ given by $$f_c=\nu_p/2\pi+\omega_B/2\pi \quad (2)$$

where $\nu_p$ is the scattering frequency of inverted carriers (i.e., those excited carriers establishing population inversion), and $\omega_B$ is the cyclotron frequency of the high-mobility carriers, and is given by $$\omega_B=g\ B/m \quad (3)$$

where $q$ is the charge on the majority carrier, $B$ is the flux density of any magnetic field extending through the active medium and $m$ is the majority carrier effective mass in the lower valley. Since the operating frequency cannot be lower than $\nu_2/2\pi$it can be appreciated that, unless an applied magnetic field extends through the wafer, the operating frequency bandwidth would be very limited, and in fact, any operation would be of low efficiency because it would not be at the center frequency. The magnetic field $\omega_B$ may typically be 20 kilogauss which, in the case of gallium arsenide, would give a center frequency of operation of 960 gigaHertz.

It can further be shown that the operating frequency bandwidth B.W. is given approximately by $$B.W.=_p/\pi \quad (4)$$

An explanation of the derivation of equations (1), (2), and (3) is given in the Appendix.

The direct current bias across the wafer should be large enough to transfer a majority of electrons to the upper valley; in the case of gallium arsenide, the bias field should be in excess of 4,000 volts per centimeter. On the other hand, steps must be taken to prevent the formation of traveling electric field domains, as described, for example, in the aforementioned Gunn patent. One way is to use a "subcritically doped" wafer, that is, a wafer having a sufficiently small product of carrier concentration and length ($n$L), as described generally in the patent of Hakki et al., U.S. Pat. No. 3,490,051 granted Jan. 30, 1970. More specifically, traveling domains will not be formed in a wafer of two-valley material if the following condition is met:

$$\frac{\epsilon 4\pi^2 D}{q\mu_1 L} < -nL(1+\gamma) < 2.2\frac{\epsilon v_{01}}{q\mu_1} \qquad (5)$$

where $D$ is the diffusion constant of the wafer, $v_{01}$ is the lower energy band carrier drift velocity, $\mu_1$ is the lower band, mobility, $\epsilon$ is the dielectric permittivity, $n$ is the carrier concentration, L is the wafer length between opposite contacts, and $\gamma$ is the field rate of transfer of majority carriers from the lower energy band to the upper band. For gallium arsenide, this condition will normally be met by the use of a wafer having a product of carrier concentration and a sample length of less than about $10^{12}$ carriers—centimeter $^{12}$.

Another technique is to make the thickness of the wafer sufficiently small, as described in the paper "The Effect of Small Transverse Dimensions on the Operation of Gunn Devices," by G. S. Kino and P. N. Robson, *Proceedings of the IEEE*, Nov. 1968, pages 2,056–2,057. Traveling domains in gallium arsenide can be prevented by keeping the product of carrier concentration and thickness ($nd$) less than about $1.6\times10^{11}$ carriers - centimeter$^{12}$. Still another technique is to couple an appropriate external resonator to the wafer to give LSA operation in accordance with the aforementioned Copeland application.

Ordinarily, microwaves incident on a subcritically doped wafer will produce space-charge waves in the wafer. This is not true of my maser because frequencies sufficiently high to comply with equation (1) are too high to excite space-charge waves, and also because the RF electric field vectors are transverse to the DC wafer current rather than being parallel to it.

Of course, the problem of traveling domains and space-charge waves exists only because of the DC differential negative resistance resulting from a negative slope portion of the electron velocity versus electric field curve of two-valley materials such as gallium arsenide. By simply using as the active medium a two-valley material that does not display a DC differential negative resistance, one avoids the problem at the outset. Examples of such materials are N-type gallium antimonide having a carrier concentration of about $10^{15}$ carriers — centimeter $^{13}$ and a temperature above that of liquid nitrogen, and N-type germanium. Also, gallium arsenide phosphide alloy ($GaAs_xP_{1-x}$) having an intervalley gap smaller than that of gallium arsenide may be used.

Figure 5:
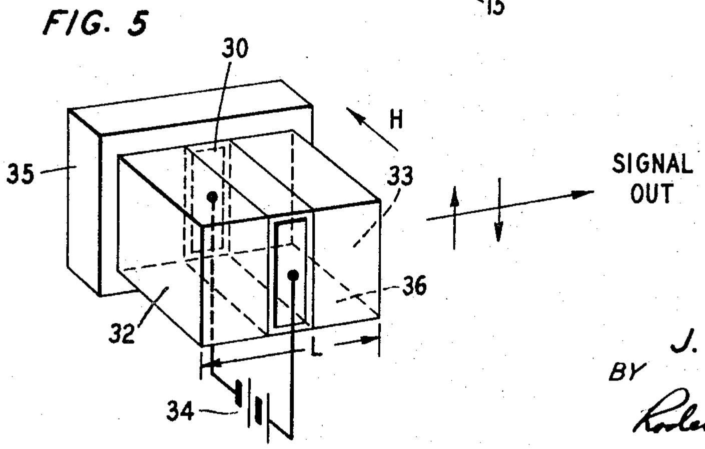
FIG. 5 is a schematic illustration of a maser oscillator in accordance with another embodiment of the invention.

As is generally true of masers, my device may be used either as an amplifier or as an oscillator, and FIG. 5 illustrates use as an oscillator. The semiconductor wafer active medium 30 is contained within a resonator 36 designed to support a microwave oscillatory mode at a resonant frequency within the range described in equation (1) by microwave reflection between opposite faces 32 and 33. A bias source 34 produces a DC current in the wafer having direction transverse to the direction of electric field vectors in the resonant oscillatory mode of the resonator. A magnet 35, only one pole piece of which is shown, produces a *d-c* magnetic field through the wave in a direction parallel to that of the DC electric field. Microwave radiation reflected between faces 32 and 33 stimulates the emission of additional radiation at the resonant frequency. Face 33 is partially transparent so that part of the oscillatory energy may leave the resonator as indicated by the signal output arrow. The output energy of course may be transmitted by an appropriate waveguide or radiated by an appropriate antenna. As is generally known in the art, the distance L between faces 32 and 33 may be one wavelength long if the faces are electrically nonconductive; but if the faces are metallized, L is preferably one-half wavelength.

Figure 6:
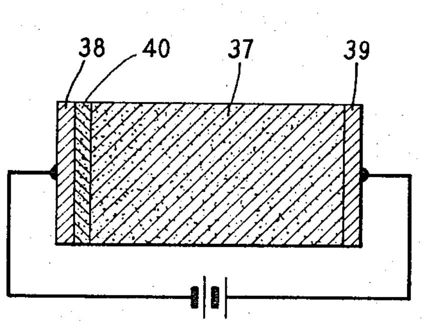
FIG. 6 is a sectional schematic view of a maser device in accordance with another embodiment of the invention.

FIG. 6 shows another maser device comprising an active medium 37 contained between cathode and anode contacts 38 and 39. The active medium is illustratively a wafer of N-type two-valley semiconductor material which gives maser action in accordance with the principles described before. The device of FIG. 6 may be used either in the amplifier environment of FIG. 1 or in the oscillator of FIG. 5. It differs from the masers in those figures in the inclusion of an intermediate layer 40 of semiconductor material between the cathode contact and the active medium 37.

Assuming that the wafer 11 of FIG. 2 is of N-type material, there is a certain "dead space" in the wafer adjacent the cathode contact 16 in which electrons injected from the cathode contact are in the process of being excited to higher energy, but have not as yet established a population inversion. The FIG. 6 device reduces or eliminates this dead space by using as the intermediate layer 40 a material having a lower stable energy band at the same energy level as the unstable upper energy band of the active medium 37. Electrons are therefore injected from the intermediate layer 40 directly into the upper energy band valley of the active medium, thus accelerating the population inversion process described before.

Figure 7:
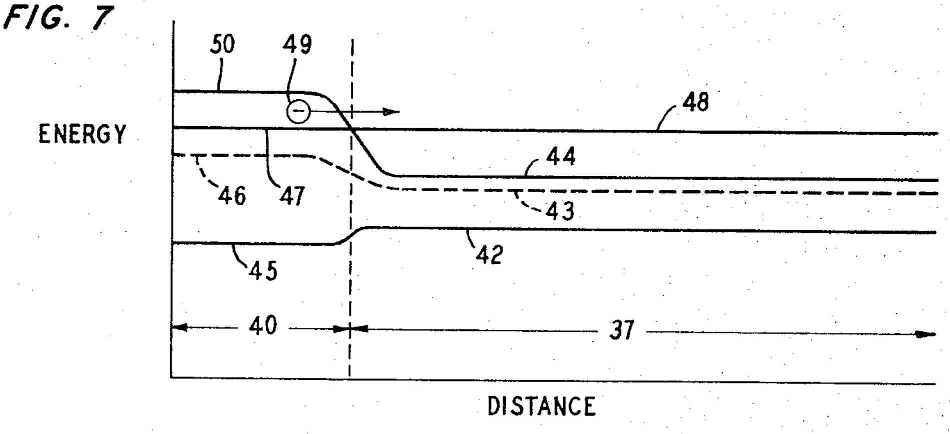
FIG. 7 is an illustration of energy bands in the maser device of FIG. 6.

Referring to FIG. 7, there is shown an energy band diagram of the two semiconductors of FIG. 6. Reference numerals 42, 43, and 44 respectively show the upper boundary of the valence band, the Fermi level, and the lower boundary of the conduction band of the active medium 37. Reference numerals 45, 46, and 47 respectively show the upper boundary of the valence band, the Fermi level, and the lower boundary of the conduction band of intermediate layer 40 when the device is suitably biased to give maser action. As is known, the lower boundary 44 of the conduction band corresponds to the energy level $E_{v1}$ of the bottom of the lower energy valley. The minimum $E_{v2}$ of the upper valley of the active wafer is shown by line 48. As can be seen, when the device is suitably biased, the lower conduction band boundary 47 of the intermediate layer is at the same energy level as the upper valley minimum 48 of active wafer 37. Thus, electrons, shown schematically as electron 49, are injected directly from the intermediate layer to the upper valley of the active medium. This means that the population inversion can extend across substantially the entire length of the active medium thereby reducing or eliminating the "dead space."

If gallium arsenide (GaAs) is used as the active wafer 37, it can be shown that gallium phosphide (GaP) is admirably suited for use as the intermediate layer 40. When the device is biased with an electric field suitable for giving maser action, the lower conduction band boundary of gallium phosphide is at approximately the same energy level as the upper valley of gallium arsenide. More importantly, thermally stable electrons of gallium phosphide have the same momentum, or $k$-space, vectors as electrons in the upper valley of gallium arsenide. Gallium phosphide is two-valley material, the lower valley being known as the <100> valley and the upper valley, shown in FIG. 7 as 50, being known as the <000 valley. In gallium arsenide, the lower valley corresponding to energy level 44 is the <000> valley and the upper valley is the <100> valley. These designations indicate the $k$-space vectors of electrons in the valley, and the fact that electrons at levels 47 and 48 of FIG. 7 both have <100> vectors results in efficient injection into the gallium arsenide upper valley. It is also important for smooth injection that the intermediate layer 40 be a crystalline extension of the lattice structure of wafer 37; intermediate layer 40 should therefore be an epitaxial layer.

Layer 40 is preferably made as thin as possible consistent with the mechanism described; that is, it should not be so thin as to permit tunneling from cathode contact 38 to the wafer 37. With the materials described it may have a typical thickness of 0.05 micron to 0.5 micron. The intermediate layer 40 should be of the same conductivity type as the active wafer but should be more lightly doped. For example, if the active wafer has a doping concentration of $10^{15}$ carriers per cubic centimeter, the intermediate layer may have a doping concentration of from $10^{10}$ to $10^{14}$ carriers per cubic centimeter. The interface between contact 38 and layer 40 should be an injecting contact, preferably an ohmic contact, although it may be a Schottky barrier contact.

The efficiency of LSA diodes, described in the aforementioned Copeland application, can also be improved by using the structure of FIG. 6. While such diodes are not masers, they do require intervalley scatter for producing negative resistance, and direct injection into the upper valley reduces or eliminates the dead space described above.

While the invention has been discussed largely with reference to N-type gallium arsenide, other materials, including P-type material, could be used as the two-valley active medium. Various techniques applicable to masers in general are of course applicable to the particular maser that has been described. For example, my maser wafer can be used in a reflection-mode or one-port amplifier structure. As is true of many masers, efficiency and frequency of operation may be increased by artificially cooling the wafer to inhibit phonon emission. Various other embodiments and modification may be made by those skilled in the art without departing from the spirit and scope of the invention.

APPENDIX

It is to be assumed that the distribution function $f(k)$ consists of a stationary part $f_o(k)$ and a pertubation component $f_1(k)$ which is proportional to the small-signal *rf* electric field, $E_1e^{i\omega t}$, and has the same time dependence.

$$f(k)=f_o(k)+1(k) \qquad (6)$$

The stationary part $f_o(k)$ can be found by solving the Boltzmann equation for $df_o/dt=0$ where $$\frac{df_o}{dt}=(q/\hbar)[E_o+v(k)\times B_o]\cdot\nabla f(\mathbf{k})$$

$$+\int[f_o(\mathbf{k}^\nabla)S(\mathbf{k}^\nabla,\mathbf{k})-f_o(\mathbf{k})S(\mathbf{k},\mathbf{k}^\nabla)]d\mathbf{k}^\nabla \qquad (7)$$

where $S(\mathbf{k}^\nabla,\mathbf{k})d\mathbf{k}^\nabla$ is the probability per unit time that a carrier will scatter from $\mathbf{k}^\nabla$ to $\mathbf{k}$, $q$ is the carrier's charge, and $v(k)$ is velocity, $$\mathbf{v}(\mathbf{k})=\nabla\epsilon(\mathbf{k})/\hbar \qquad (8)$$

and $\epsilon(k)$ its energy.

Equation (7) will in general have to be solved for $f_o(k)$ by numerical techniques to find the essential details which are lost by most analytical approximation techniques.

By adding $f_1$ and $\mathbf{E}_1e^{i\omega t}$ into (7) and using $df_1/dt=i\omega f_1$, the terms with $e^{i\omega t}$ time dependence give for $B=O$:

$$i\omega f_1(\mathbf{k})=(q/\hbar)\mathbf{E}_1\cdot\nabla f_o(\mathbf{k})+\nu(\mathbf{k})f_{1s}(G)-\nu(\mathbf{k})f_1(\mathbf{k}) \qquad (9)$$

$$f_1(k)=\left[\frac{\nu(\mathbf{k})-i\omega}{\nu^2(\mathbf{k})+\omega^2}\right]\left[\frac{qE_1}{\hbar}\frac{\partial f_o(\mathbf{k})}{\partial k_x}+\nu(\mathbf{k})f_{1s}(\mathbf{k})\right] \qquad (10)$$

where the total scattering rate $\nu(k)$ and the scattering function weighted average of $f_1$, $f_{1s}(k)$ have been introduced to represent the integrals obtained $$\nu(\mathbf{k})=\int S(\mathbf{k},\mathbf{k}^\nabla)d\mathbf{k}^\nabla \qquad (11)$$

$$f_{1s}(\mathbf{k})=\int f_1(\mathbf{k}^\nabla)S(\mathbf{k}^\nabla,\mathbf{k})dk/\nu(\mathbf{k}) \qquad (12)$$

The power per carrier delivered to the *rf* field is given by the real part of $-9E_1\cdot<v_1>/2$ so $$P=-(qE_1/2)Re\int v_x(\kappa)f_1(\mathbf{k})dk \qquad (13)$$

$$=-\frac{q^2E_1^2}{2\hbar}\int v_x(\mathbf{k})\left[\frac{\nu(\kappa)}{\nu^2(\mathbf{k})+\omega^2}\right]\frac{\partial f_o(\mathbf{k})}{\partial k_x}d\mathbf{k} \qquad (14)$$

where it is assumed that $f(k)$ is normalized so that $\int f,k)dk$ is unity.

In writing (14), the assumption was made that the term involving $f_{1s}(k)$ in (10) could be neglected. In previous treatments $f_{1s}(k)$ was set equal to zero by assuming $f_1(k^\nabla)S(k^\nabla,k)=-f_1(-k^\nabla)S(-k^\nabla,k)$ which is not always correct. When the rf electric is not perpendicular to $E_o$ or when a dc magnetic field $B_o$ is present, then $f_1(k)\neq -f_1(-k)$. When (10) is incorporated into (13) to derive (12), the $f_{1s}(k)$ term would disappear if $S(k^\nabla,k)=S(k^\nabla,-k)$ since $v_x(k)=-v_x(-k)$ and the integral over $k$ would then be zero. This assumption on $S(k,K^\nabla)$ is also not exactly correct but it is usually made as a valid approximation. It certainly appears that $f_{1s}$ can be neglected in most cases of interest here, but should not be entirely forgotten. (A case where this term dominates is in the upper valleys of the well known two-valley transferred electron effect.)

In writing (14), the assumption was made that the term involving $f_{1s}(k)$ in (10) could be neglected. In previous treatments $f_{1s}(k)$ was set equal to zero by assuming $f_1(k\ )S(k\ ,k)=-f_1(-k\ )S(-k\ ,k)$ which is not always correct. When the *rf* electric is not perpendicular to $E_o$ or when a *dc* magnetic field $B_o$ is present then $f_1(k)\ -f_1(-k)$. When (10) is incorporated into (13) to derive (12), the $f_{1s}(k)$ term would disappear if $S(k\ ,k)=S(k\ ,-k)$ since $v_x(k)=-v_x(-k)$ and the integral over $k$ would then be zero. This assumption on $S(k,K\ )$ is also not exactly correct but it is usually made as a valid approximation. It certainly appears that $f_{1s}$ can be neglected in most cases of interest here, but should not be entirely forgotten. (A case where this term dominates is in the upper valleys of the well-known two-valley transferred electron effect.)

The results thus far have been obtained using small-signal (first order perturbation) technique. To find the limitations on the validity of the results we must consider the physical model implied by (14). Equation (14) represents a three-dimensional distribution function $f_0(k)$ which is vibrating back and forth linearly in $k$-space parallel to the direction of the *rf* electric field with a complex amplitude given by $$\Delta\mathbf{k}=(qE_1/\hbar)/[\nu(\mathbf{k})+i\omega] \qquad (15)$$

The real part of $\Delta k_x$ is the component in phase with the *rf* field. The change in $f(k)$ to second order is then $$\Delta f(\mathbf{k})=\frac{\partial f_o}{\partial k_x}\Delta k+\frac{\partial^2 f_o}{\partial k_x^2}(\Delta k)^2 \qquad (16)$$

$$=f_1(\mathbf{k})+\frac{qE_1^2}{\hbar^2(\nu+i\omega)^2}\frac{\partial^2 f_o}{\partial k_x^2} \qquad (17)$$

The second term on the right of (17) is smaller than $f_1(k)$ if $$E_1<\frac{\hbar(\nu+i\omega)(\partial f_o/\partial k_x)\cdot}{q(\partial^2 f_o/\partial k_x^2)} \qquad (18)$$

From (14) most of the *rf* power is generated by regions of $k$-space where $\nu(k)$ is on the order of $\omega$. Equation (18) implies that the maximum value of $E_1$ for linearity increases in proportion to the scattering frequency in the inversion region $\nu_\mu$.

If the frequency $\omega$ is too low, so that the average drift velocity (i.e., $f_o$) rotates with the applied *rf* field, then there can only be absorption when the *rf* field is transverse to the *dc* field $E_o$. This is true even when there is a negative differential mobility for *rf* fields parallel to $E_0$. These considerations lead to the lower frequency limit stated in equation (1) of the body of the specification.

One can see in the case of n-gaAs a clear distinction between the two-valley transferred electron effect which requires frequencies on the order of 200 GHz. or less so that the distribution can change drastically during the *rf* period, and the continuum maser effect which requires frequencies above about 200 GHz. so that the distribution function only has time to vibrate linearly during the *rf* period.

The term in brackets in the integrand of (14)

$$A(k,\omega)=\nu(k)/[\nu(k)^2+\omega^2] \qquad (19)$$

has a maximum value of one-half $\omega$ when $\nu=\omega$ and goes to zero when either $\nu/\omega\rightarrow 0$ or $\nu/\omega\rightarrow\infty$. The importance of $A(k)$ is that it can emphasize only those regions of $k$-space where there is a population inversion; that is, regions where $v_x(\mathrm{k})\partial f_o/\partial k_x$ is negative. Because of the minus sign on the right side of (14), it is only these regions that add power to the $rf$ field.

As a simple example, suppose that $\nu(k)=\nu(k)$varies rapidly with $k$in the population inversion regions so that $\nu k)$ and $\partial f_o/\partial k$ are approximately constant in the region where $A(k)$ is appreciable. Then the power per carrier (14) would become approximately $$P=-\frac{q^2E_1^2}{\hbar}\left[\frac{4\pi k^2\nu}{3}\frac{\partial f_o}{\partial k}\right]\int_0^\infty\frac{\nu}{\nu^2+\omega^2}\frac{d\nu}{(d\nu/dk)}$$

$$=-\frac{2\pi^2q^2E_1^2}{3m^*}\left[\frac{k^3(\partial F_o/\partial k)}{(\partial\nu/\partial k)}\right] \qquad (20)$$

where the term in brackets is an average value for the region of $k$-space where $A(K,\omega)$ is appreciable. Notice that the result is independent of $\nu$ and $\omega$ as long as $\omega \doteq \nu(\mathrm{k})$ in the inversion region, except through $\overline{\partial\nu}/\partial k$.

Actual cases will generally be too complicated to allow approximations such as the above. However, it should be noted that $\omega$ can vary on the order of the value of $\nu(k)$ where $A(k,\omega)$ is appreciable without changing the value of $A(k,\omega)$ very much. This consideration leads to the approximate frequency bandwidth stated in equation (3) of the body of the specification.

Application of a $DC$ magnetic field $B_o$ perpendicular to the $rf$electric field $E_1$ can be used to raise the operating frequency by the carrier's cyclotron frequency $\omega_B$ in the population inversion region where $$\omega_B=(9/m^*)B_o \qquad (21)$$

and $m^*$ $(k)$ the cyclotron effective mass. In complicated band structures $m^*$ may vary greatly over $k$-space. The equation for power generation then becomes $$P(\omega)=-\frac{q^2E_1^2}{4\hbar}\int A(\mathrm{k},\omega)v_x(k)\frac{\partial f_o}{\partial k_x}d\mathrm{k} \qquad (22)$$

$$A(\mathrm{k},\omega)=\frac{\nu(\mathrm{k})}{\nu^2(\mathrm{k})+(\omega-\omega_B)^2}+\frac{\nu(\mathrm{k})}{\nu^2(\mathrm{k})+(\omega+\omega_B)^2}. \qquad (23)$$

If $\omega_B>>\nu(k)$, the second term on the right side of (23) will not contribute much to $A(k,\omega)$. Also the variation of $m^*$ $(k)$ may increase the value of $p$ by making $A(k,\omega)$ more sharply peaked in the population inversion region.

The effect of a magnetic field is beneficial because the operating frequency can be extended to much higher frequencies than $\nu_p/2\pi$ and in particular can be raised above the minimum frequency which may be higher than $\nu_p 2\pi$.

The application of $B_o$ will change the unperturbed distribution function $f_o(k)$ unless it is axially symmetric around the direction of $B_o$. In most cases $f_o(k)$ will be axially symmetric around the direction of $E_l$. For n-GaAs having $E_o$, $B_o$, and $H_1$ along the same axis appears to be the best arrangement.

The device will consist of a piece of semiconducting material with DC contacts so that the necessary DC bias field and current can be impressed. For amplification, the circuit will consist of waveguide or lenses which cause the signal to propagate through the material with the proper polarization. On a single transit the signal power will be amplified by the factor $G$ given by $$G=e^{-2W/\delta} \qquad (24)$$

where $W$ is the width of the material and $\delta$ is the skin depth $$\delta=Im(U\epsilon\omega^2+iUn\mu q\omega)^{1/2} \qquad '(25)$$

$$|\delta|=(Un|\mu|q\omega/2)^{-1/2}, \qquad |\delta|\ll\lambda \qquad (26)$$

$$|\delta|=2^{1/2}(Un|\mu|q\omega)^{-1}, \qquad |\delta|\gg\lambda \qquad (27)$$

where $\mu(\omega)$ is the effective differential mobility of the carriers, $U$ is the susceptibility, $\epsilon$ is the permittivity, and $n$ is the carrier density. Notice that $\delta$ always has the same sign as $\mu(\omega)$ and must be negative for amplification. Since at low frequencies and electric fields $P=-qE_1^2\mu/2$, $$\mu(\omega)=-2P(\omega)/qE_1^2 \qquad (28)$$

a wafer of semiconductor material of a class characterized by a lower, thermally stable, energy band valley, and an upper, thermally unstable, energy band valley, carriers in the lower band having a higher mobility than those in the upper band;

first and second contacts on opposite sides of the wafer;

where $P(\omega)$ is found from (14) or (22).

As mentioned before, by having internal reflections or an external cavity, with the proper phase relationship, the gain can be increased or sustained oscillation can be produced.

What is claimed is:

1. A maser comprising:

means comprising a direct-current source for applying to the contacts a sufficient voltage to transfer a majority of carriers of the lower band to the upper band;

said wafer being further characterized by the inability to form space-charge waves or traveling domains in response to the applied voltage, whereby a population inversion occurs;

and means for stimulating emission of microwave radiation from the wafer comprising means for directing through the wafer electromagnetic wave energy of a frequency $f$ that substantially complies with the relation $$\nu_a/2\pi<f$$

where $\nu_a$ is the average scattering frequency.

2. The maser of claim 1 wherein:

the electric field of the electromagnetic wave energy extends in a direction substantially transverse to the direction of carrier current in the wafer.

3. The maser of claim 2 further comprising:

a layer of semiconductor material between the first contact and the wafer characterized by a lower, thermally stable, energy band valley of substantially the same energy level as the upper valley of the wafer, whereby carriers are injected from the layer lower valley to the wafer upper valley.

4. The maser of claim 2 further comprising:

means for producing a direct-current magnetic field in the wafer extending in a direction substantially parallel to the direction of carrier current in the wafer.

5. The maser of claim 5 wherein:

the frequency $f$ is given approximately by the relation $$f=\nu_p/2\pi+q/2\pi B$$

where $\nu_p$ is the scattering frequency of carriers in the upper valley, $B$ is the magnetic field flux density, $q$ is the charge on a majority carrier, and $m^*$ is the effective mass of a majority carrier.

6. The maser of claim 2 wherein:

the wafer is made of a material further characterized by the absence of a direct-current differential negative resistance.

7. The maser of claim 6 wherein:

the wafer is N-type gallium antimonide of a temperature above the temperature of liquid nitrogen.

8. The maser of claim 6 wherein:

the wafer is N-type germanium.

9. The maser of claim 3 wherein:

the layer has the same conductivity type but a lower carrier concentration than the wafer.

10. The maser of claim 9 wherein:

the layer is an epitaxial layer.

11. The maser of claim 10 wherein:

the wafer and layer are of N-type conductivity, and the layer is located between a negative biased contact and the wafer.

12. The maser of claim 11 wherein:

the wafer is of gallium arsenide and the layer is of gallium phosphide.

13. A wide band direct-current pumped maser comprising:

a wafer of bulk gallium arsenide;

contacts on opposite sides of the wafer for producing a direct current through the wafer in a first direction;

means for directing signal energy to be amplified through the wafer such that electric field vectors of the signal wave are transverse to said first direction;
and means for producing a direct-current magnetic field through the wafer in a direction parallel to the first direction.

14. In combination:
a wafer of two-valley material having a lower energy band and an upper energy band;
first and second contacts on opposite sides of the wafer for producing a current through the wafer;
and means for injecting majority carriers into the upper energy band of the wafer comprising an intermediate semiconductor layer between the first contact and the wafer, the intermediate layer having a lower thermally stable energy band of substantially the same energy level as the upper energy level of the wafer.

15. The combination of claim 14 wherein:
the intermediate layer has the same conductivity type but a lower carrier concentration than the wafer.

16. The combination of claim 15 wherein:
the intermediate layer is an epitaxial layer.

17. The combination of claim 16 wherein:
the wafer and the intermediate layer of N-type conductivity, and the layer is located between a negatively biased contact and the wafer.

18. The combination of claim 17 wherein:
the wafer is of gallium arsenide and the intermediate layer is of gallium phosphide.

* * * * *

UNITED STATES PATENT OFFICE
CERTIFICATE OF CORRECTION

Patent No. 3,617,911 Dated November 2, 1971

Inventor(s) John A. Copeland, III

It is certified that error appears in the above-identified patent and that said Letters Patent are hereby corrected as shown below:

Col. 3, line 5, delete "enchances" and substitute therefor --enhances--.

Col. 4, line 17, change "($E_{v2}$ + 3/2 k 1)" to --($E_{v2}$ + 3/2 k T)--.

line 55, change Equation (3) from

"$\omega_B = \frac{g\,B}{m}$" to --$\omega_B = \frac{q\,B}{m^*}$--.

line 58, change "m" to --m* --.

line 69, Equation (4), change

"B.W. = $_p/\pi$" to --B.W. = $\frac{\nu_p}{\pi}$--.

Col. 5, Equation (5), under "<" insert --$\sim$--, both instances.
line 25, change "centimeter$^{12}$" to --centimeter$^{-2}$--.
line 34, change "centimeter$^{12}$" to --centimeter$^{-2}$--.
line 54, change "centimeter$^{13}$" to --centimeter$^{-3}$--.
line 56, change equation "($GaAs_xP_{11x}$)" to --($GaAs_xP_{1-x}$)--.

Col. 6, line 59, change "<000" to --<000>--.

Col. 7, line 54, Equation (9), change "(G)" to --($\underline{k}$)--.
line 69, change "$-9\underline{E}_1 \cdot \langle \nu_1 \rangle /2$" to -- $-q\underline{E}_1 \cdot \langle \underline{v}_1 \rangle /2$--.

Col. 8, line 2, change "$f_{13}(k)$" to --$f_{1s}(\underline{k})$--.
lines 16 through 30, delete the paragraph.

UNITED STATES PATENT OFFICE
CERTIFICATE OF CORRECTION

Patent No. 3,617,911 Dated November 2, 1971

Inventor(s) John A. Copeland III

It is certified that error appears in the above-identified patent and that said Letters Patent are hereby corrected as shown below:

Col. 8, line 67, delete "n-gaAs" and substitute therefor --n-GaAs--.

Col. 9, line 7, cancel "νk)" and substitute --ν(k)--.
line 18, change "A(K,ω)" to --A($\underline{k}$,ω)--.
line 32, change Equation (21) from "$\omega_B = (9/m^*)B_o$" to --$\omega_B = (q/m^*)B_o$--.
line 52, change "$\nu_p 2\pi$" to --$\nu_p/2\pi$--.
line 56, cancel "$E_1$" and substitute therefor --$\underline{E}_o$--.
line 67, Equation (25), change
"$\delta = \text{Im}(U\varepsilon\omega^2 + iUn\mu q\omega)^{1\ 1/2}$" to
--$\delta = \text{Im}(U\varepsilon\omega^2 + iUn\mu q\omega)^{-1/2}$--.

Col. 10, lines 1 through 6, delete in their entirety;
between lines 12 and 13 (Claim 1) after "comprising:" insert the following:

--a wafer of semiconductor material of a class characterized by a lower, thermally stable, energy band valley, and an upper, thermally unstable, energy band valley, carriers in the lower band having a higher mobility than those in the upper band;

first and second contacts on opposite sides of the wafer;--.

(Claim 5) after "claim" change "5" to --4--;

UNITED STATES PATENT OFFICE
CERTIFICATE OF CORRECTION

Patent No. 3,617,911 Dated November 2, 1971

Inventor(s) John A. Copeland III

It is certified that error appears in the above-identified patent and that said Letters Patent are hereby corrected as shown below:

Col. 10, (Claim 5) change the relation "$f = v_p/2\pi + q/2\pi B$"
to read --$f = \upsilon_p/2\pi + \frac{q}{2\pi}\frac{B}{m*}$ --.
line 45, (Claim 5) change "$v_p$" to --$\upsilon_p$--.

Col. 12, (Claim 17) after "layer" insert --are--.

Signed and sealed this 30th day of May 1972.

(SEAL)
Attest:

EDWARD M.FLETCHER,JR.
Attesting Officer

ROBERT GOTTSCHALK
Commissioner of Patents